(12) United States Patent
Johnson

(10) Patent No.: US 8,002,218 B2
(45) Date of Patent: Aug. 23, 2011

(54) COMBINATION VENTILATION AND OVERHEAD STOWAGE BIN SYSTEM

(75) Inventor: Glenn A. Johnson, Rural Hall, NC (US)

(73) Assignee: BE Aerospace, Inc., Wellington, FL (US)

( * ) Notice: Subject to any disclaimer, the term of this patent is extended or adjusted under 35 U.S.C. 154(b) by 474 days.

(21) Appl. No.: 12/190,691

(22) Filed: Aug. 13, 2008

(65) Prior Publication Data
US 2010/0038482 A1   Feb. 18, 2010

(51) Int. Cl.
B64D 11/00 (2006.01)
B64D 13/00 (2006.01)
B64D 13/08 (2006.01)

(52) U.S. Cl. ........... 244/118.5; 244/118.1; 244/118.6; 454/71; 454/76; 312/245; 165/235

(58) Field of Classification Search .......... 244/118.5, 244/118.1, 118.6; 454/71–77, 69; 312/245–248; 165/235
See application file for complete search history.

(56) References Cited

U.S. PATENT DOCUMENTS

| | | | | |
|---|---|---|---|---|
| 2,200,992 A | * | 5/1940 | Lintern | 454/138 |
| 2,250,619 A | * | 7/1941 | Austin | 454/93 |
| 4,742,760 A | * | 5/1988 | Horstman et al. | 244/118.5 |
| 5,549,258 A | * | 8/1996 | Hart et al. | 244/118.5 |
| 5,716,027 A | * | 2/1998 | Hart et al. | 244/118.5 |
| 6,241,186 B1 | * | 6/2001 | Calnon | 244/118.5 |
| 6,273,365 B1 | * | 8/2001 | Hiesener et al. | 244/118.5 |
| 6,318,671 B1 | * | 11/2001 | Schumacher et al. | 244/118.5 |
| 6,752,712 B1 | * | 6/2004 | Short et al. | 244/118.5 |
| 6,991,276 B2 | * | 1/2006 | McCauley et al. | 296/208 |
| 2008/0268762 A1 | * | 10/2008 | Bruggen et al. | 454/76 |
| 2010/0206985 A1 | * | 8/2010 | Rahlff | 244/118.5 |

FOREIGN PATENT DOCUMENTS

| | | |
|---|---|---|
| EP | 0 301 606 A1 | 2/1989 |
| EP | 1 442 935 A1 | 8/2004 |
| EP | 1 829 745 A2 | 9/2007 |
| WO | WO 95/18727 A1 | 7/1995 |
| WO | WO 99/17958 A1 | 4/1999 |

OTHER PUBLICATIONS

Jan. 4, 2010 International Search Report issued in PCT/US2009/053641.

* cited by examiner

*Primary Examiner* — Timothy D Collins
*Assistant Examiner* — Steven Hawk
(74) *Attorney, Agent, or Firm* — Oliff & Berridge, PLC

(57) ABSTRACT

A combination ventilation and stowage bin system including at least one support duct defining an inlet for receiving conditioned air from a supply duct and an outlet for directing air into a passenger compartment, and a stowage bin for stowing luggage mounted to and supported by the at least one support duct, the stowage bin entirely supported by the duct such that the bin is free from direct attachment to an interior wall or supporting structure other than the duct.

18 Claims, 6 Drawing Sheets

COMBINATION VENTILATION AND OVERHEAD STOWAGE BIN SYSTEM

TECHNICAL FIELD AND BACKGROUND OF THE INVENTION

1. Field of the Invention

The present invention relates generally to aircraft weight saving structure and increasing stowage capacity, and more specifically, to a combination ventilation system and overhead stowage bin system wherein the ventilation system functions as the supporting structure for the bins to reduce weight, increase bin storage capacity and simplify installation.

2. Description of the Related Art

Aircraft cabin designers are constantly looking for ways to reduce weight while maximizing both passenger and luggage carrying capacity. Luggage and other items brought on board an aircraft by passengers are typically stowed under the seats and in overhead storage bins above the seats. Other passenger servicing items, such as supplies, blankets, pillows, medical items and other items are also commonly stored in the overhead bins to keep the living space of the aircraft free from these items. In addition to overhead storage bins, other systems and controls are also typically located along the interior roofline of an aircraft, such as oxygen, cabin ventilation, lighting, media and attendant call control systems, as well as other systems. It is with respect to ventilation systems and overhead luggage bins that this particular invention finds application.

Ventilation systems typically function to supply conditioned air (i.e., pressurized, heated or cooled air) throughout the interior cabin of an aircraft or other vehicle. Conventional designs typically include supply ducts that extend longitudinally along the length of the aircraft and supply conditioned air to laterally branching ducts that direct air into the cabin at predetermined positions. Ventilation systems may be positioned along the floor of the cabin or overhead. Conventional ventilation systems position the ducts away from the interface between adjacent bins and require space behind the bins, thus their position consumes valuable space in which the bins could be expanded to increase stowage capacity. Further, and most importantly, because of the position of the ducts with respect to the bin interface, both the ventilation systems and stowage bin systems are currently independently mounted to the wall or aircraft frame, leading to increased installation complexity, materials and weight.

Accordingly, what is desired is a combination ventilation and stowage bin system wherein the ventilation system serves as the supporting structure for the stowage bin system to reduce weight and increase the stowage capacity of the bins. Further, what is desired is a combination ventilation and stowage bin system that optimizes the position of the ventilation ducts with respect to the bins and bin interfaces in order to further increase the stowage capacity of the bins.

BRIEF SUMMARY OF THE INVENTION

In one aspect, the present invention provides weight reduction by utilizing an existing system as the supporting structure for another system.

In another aspect, the present invention provides a combination ventilation and stowage bin system.

In yet another aspect, the present invention provides a combination ventilation and stowage bin system having reduced weight and complexity as compared to conventional, independently mounted ventilation and luggage bin systems.

In yet another aspect, the present invention provides utilizing a ventilation system as the supporting structure for the stowage bin system.

In yet another aspect, the present invention provides an expanded stowage bin.

In yet another aspect, the present invention provides optimizing the position of overhead ventilation ducts with respect to overhead stowage bins to expand the bin stowage capacity.

To achieve the foregoing and other aspects and advantages, and in accordance with the purposes of the invention as embodied and broadly described herein, the present invention provides a combination ventilation and stowage bin system in which the ventilation system serves as the supporting structure for the stowage bin system. In one embodiment, the combination ventilation and stowage bin system includes at least one support duct defining an inlet for receiving conditioned air from a supply duct and an outlet for directing air into a passenger compartment, and a stowage bin for stowing luggage mounted to and supported by the at least one support duct.

In another embodiment, the system includes a support duct positioned about each end of a stowage bin for cooperatively supporting the stowage bin, and preferably a plurality of support ducts for supporting a plurality of stowage bins located along the interior, overhead portion of an aircraft or other vehicle passenger compartment. Each of the ducts defines a fan-shaped outlet for providing a surface for seating and supporting the stowage bin. The outlets are preferably dimensioned larger than the inlets and define a curvature for following the contour of their respective stowage bins. The system may further include a bracket for mounting the stowage bins to the ducts and a bracket for supporting the outlet of the ducts against an interior wall of the aircraft.

The support ducts are secured to an interior wall of the aircraft or to the aircraft frame. The attachment and supporting of the bins by the ducts obviates the need for independently attaching the luggage bins to the wall of aircraft frame. Each of the ducts defines an inlet that is positioned at the interface between adjacent bins to optimize the positioning of the ducts to maximize stowage capacity of the bins. Each of the stowage bins comprises a door or other structure for providing access to the interior of the bin.

In another embodiment, the present invention provides a combination ventilation and stowage bin system including a ventilation supply duct for providing conditioned air, a plurality of support ducts branching from the supply duct at predetermined positions, each support duct defining an inlet for receiving the conditioned air from the supply duct and an outlet for directing the conditioned air into a vehicle cabin, and a plurality of stowage bins secured to and supported by the plurality of support ducts. The inlets of each of the support ducts are preferably positioned at the interface between adjacent stowage bins, and support ducts define a curvature for following the contour of the plurality of stowage bins to reduce the space required by the ducts behind the bins. The system may further include a bracket for supporting the outlets against an interior wall of an aircraft cabin, and a bracket for mounting a stowage bin to adjacent ones of the plurality of support ducts.

Additional features and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
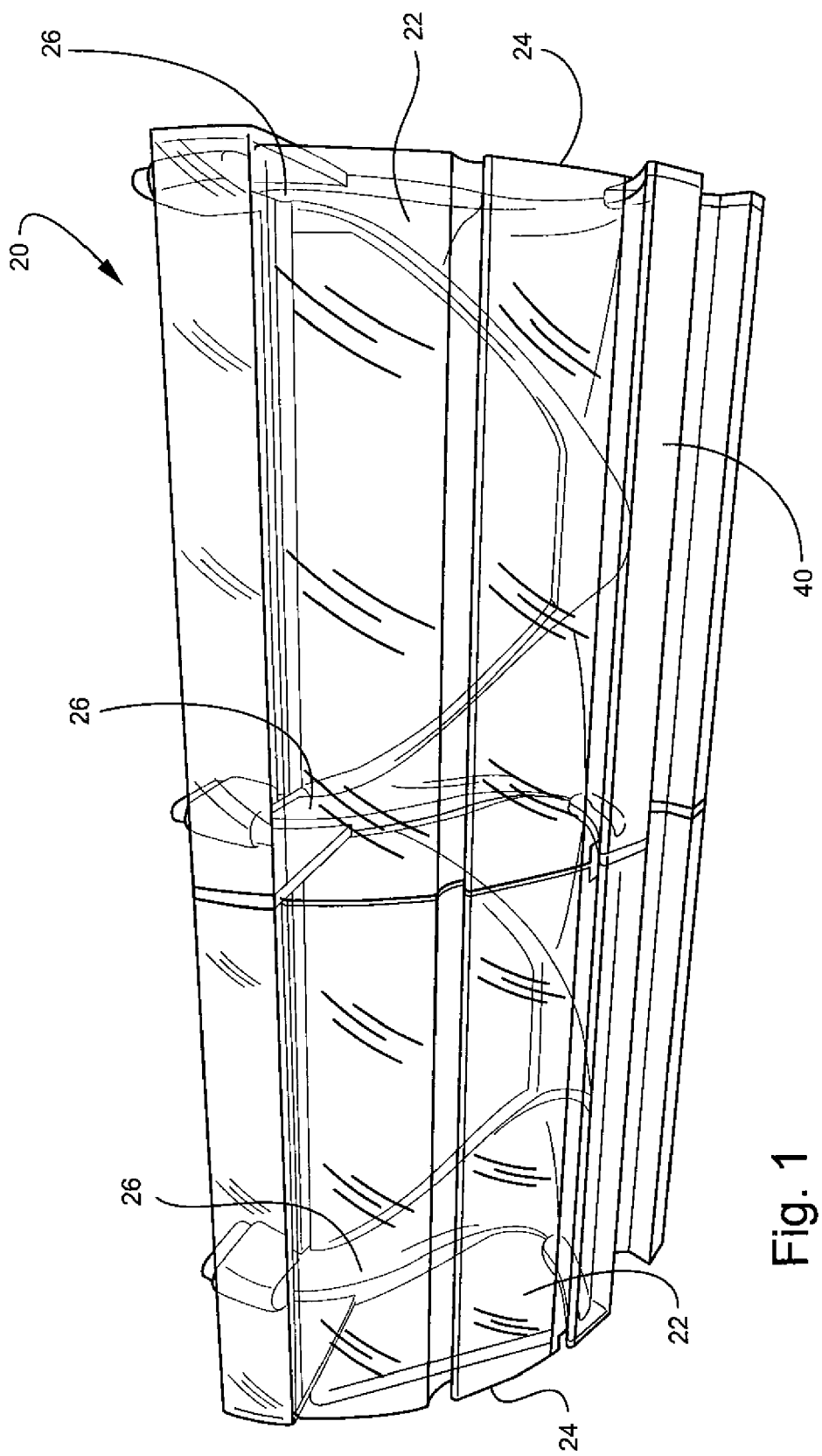
FIG. 1 is a front perspective view of a portion of a combination ventilation and stowage bin system in accordance with an embodiment of the invention.

Referring to FIG. 1, a combination ventilation and overhead stowage bin system is shown generally at 20, with the doors 22 of the stowage bins 24 shown transparent only for the purpose of detailing the underlying ventilation system. The stowage bins 24 are referred to throughout the specification as "stowage bins" or "bins," but the term is intended to generically describe any type of storage bin, passenger service unit, luggage bin or container having a stowage capacity that is supported by structure of a ventilation system, and is thus not limited to a specific bin type, number shape or position within a vehicle. Further, although the system is described with application in a passenger cabin of an aircraft in a position overhead of the passengers, the systems may be deployed in any vehicle type and in either an overhead or lower position. Further, although the stowage bins shown include doors for accessing the interior of the bins, the bins may or may not include a door and may include any other configuration for stowing items and accessing the bins.

Figure 2:
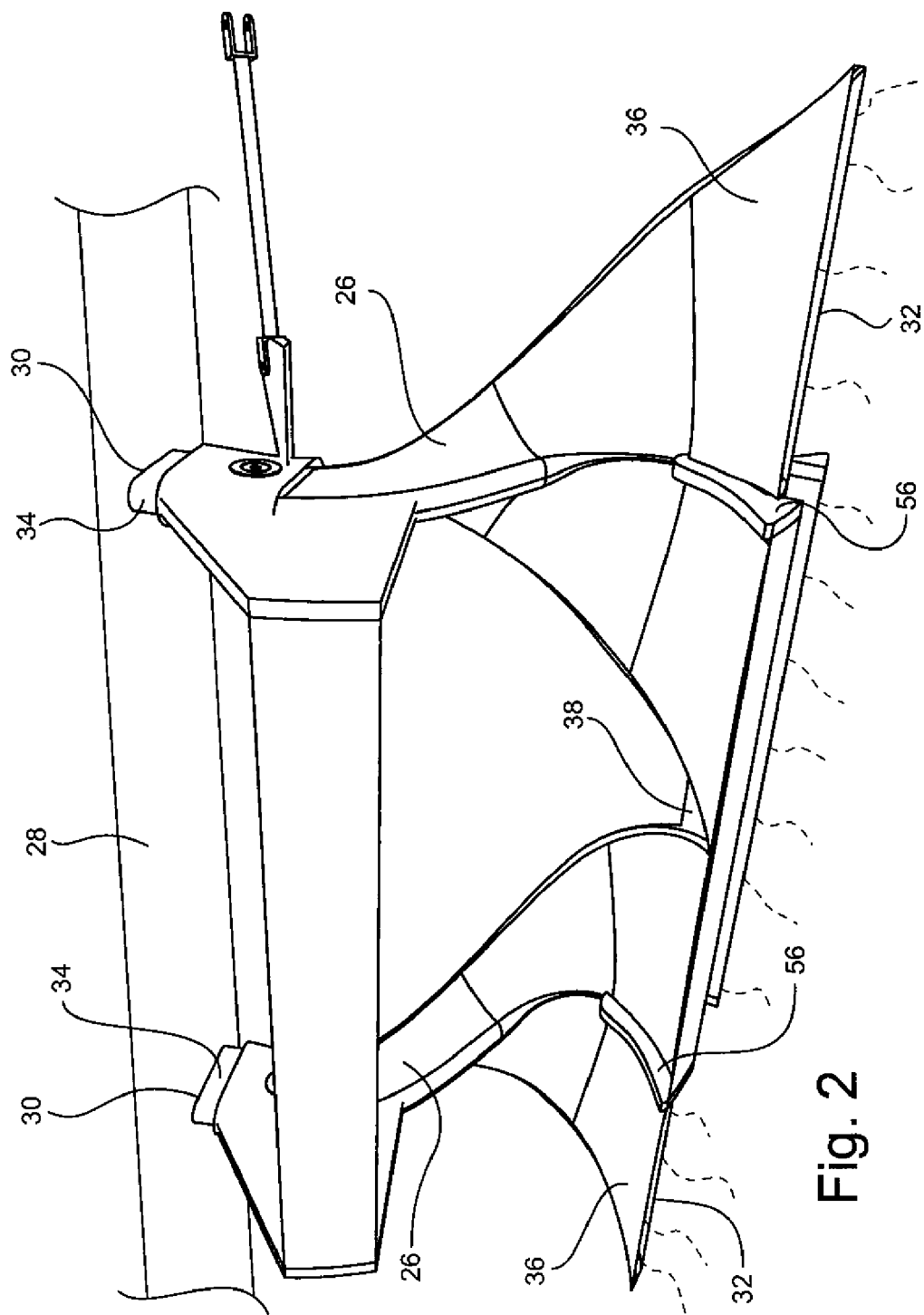
FIG. 2 is a front perspective view of the ventilation system of FIG. 1 shown without the bin system.
Figure 3:
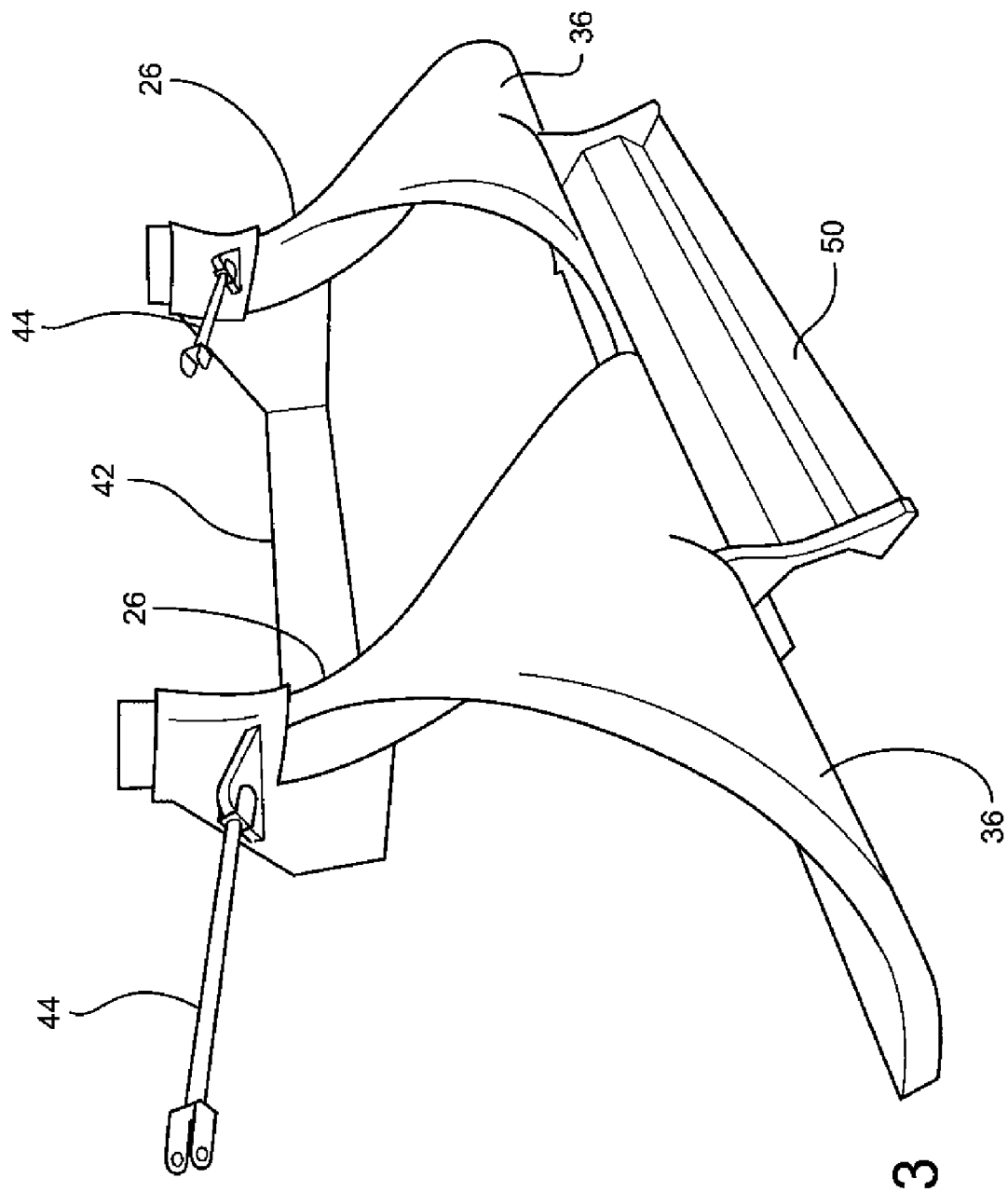
FIG. 3 is a rear perspective view of the ventilation system of FIG. 2.
Figure 4:
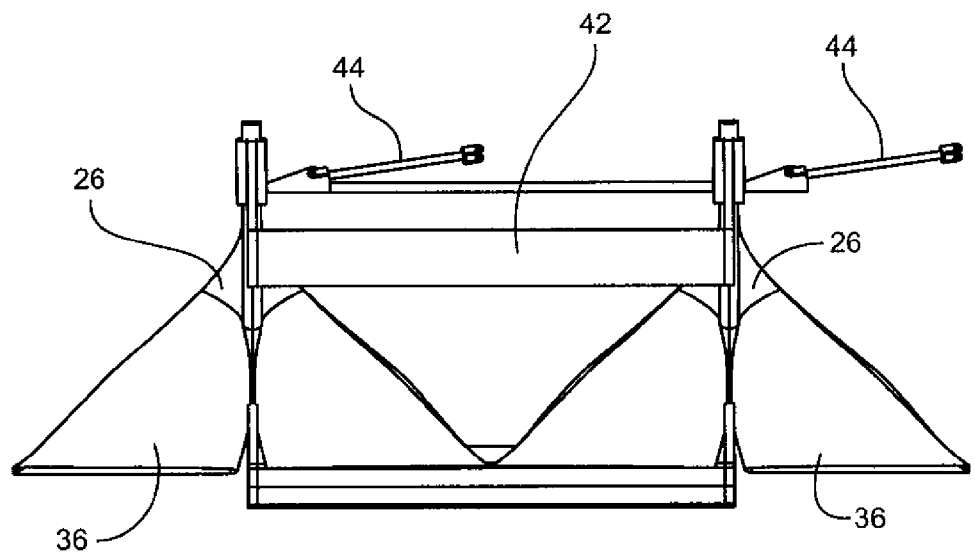
FIG. 4 is a front view of the ventilation system of FIG. 2.

Referring to FIGS. 1 and 2, the combination ventilation and stowage bin system includes at least one support duct 26 that branches from a supply duct 28 at a predetermined location. The supply duct 28 functions to supply either conditioned or unconditioned air from a source to the at least one support duct 26 that branch at predetermined positions from the supply duct. In one embodiment, the supply duct extends longitudinally along the roofline of the aircraft and the support ducts 26 branch laterally from the supply duct. The supply duct may be a component of a larger ventilation system. Each of the support ducts 26 defines an inlet 30 for receiving conditioned or unconditioned air from the supply duct, and an outlet 32 for directing air into the cabin. The outlet 32 preferably defines a larger opening than the inlet 30 to reduce the force with which the air is distributed and to provide even distribution throughout the cabin. In other words, the inlets 30 are positioned periodically along the length of the supply duct 28, while each outlet 32 is lengthened in shape to provide essentially a continuous outlet along the length of the system and thus even air distribution.

In the embodiment shown, each inlet 30 defines a neck portion 34 and each outlet defines a fan-shaped portion 36. A bridging section 38 may be provided between support ducts 26 to interconnect ducts and provide support for the duct interface and support for an attached stowage bin. The bridging section 38 may be an extension of the support ducts. The support ducts 26 define a curvature that follows the contour of their associated bin such that the duct takes up a minimum amount of valuable space between the bin and the interior wall or frame of the aircraft. The support ducts 26 may be molded to have any desired shape to accommodate any desired stowage bin shape. The ducts 26 as shown include raised portions 56 for retaining the bin therebetween.

In a further embodiment, the ducts may include a substantially continuous supporting surface that functions as a portion of the bin, thus obviating the need for a complete, independent bin. In a particular embodiment, the ducts may define one or more of back, bottom, top and side portions of the bin. In a further embodiment, the ducts may define a stowage bin completely except for the door or other structure for providing access to the interior of the bin. The outlets 32 may be covered with a faceplate 40 for concealing the outlets and diffusing the airflow.

Figure 5:
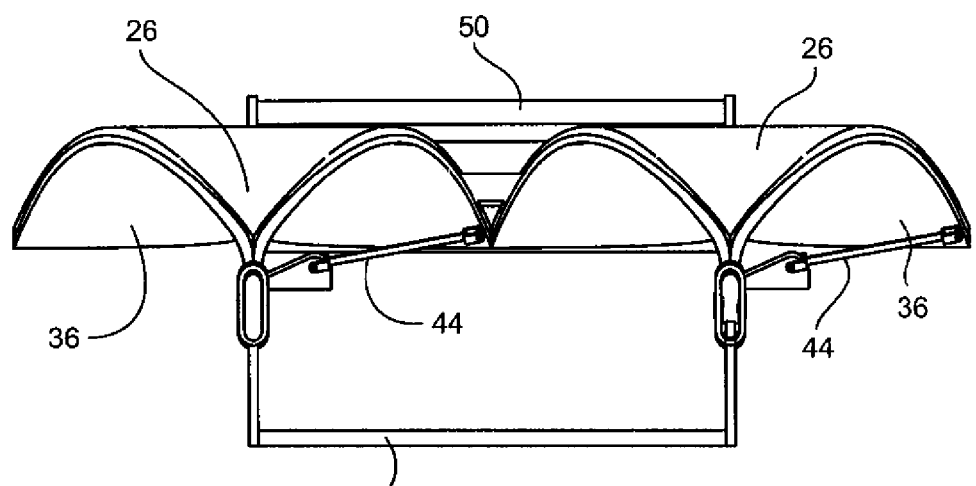
FIG. 5 is a top view of the ventilation system of FIG. 2.
Figure 6:
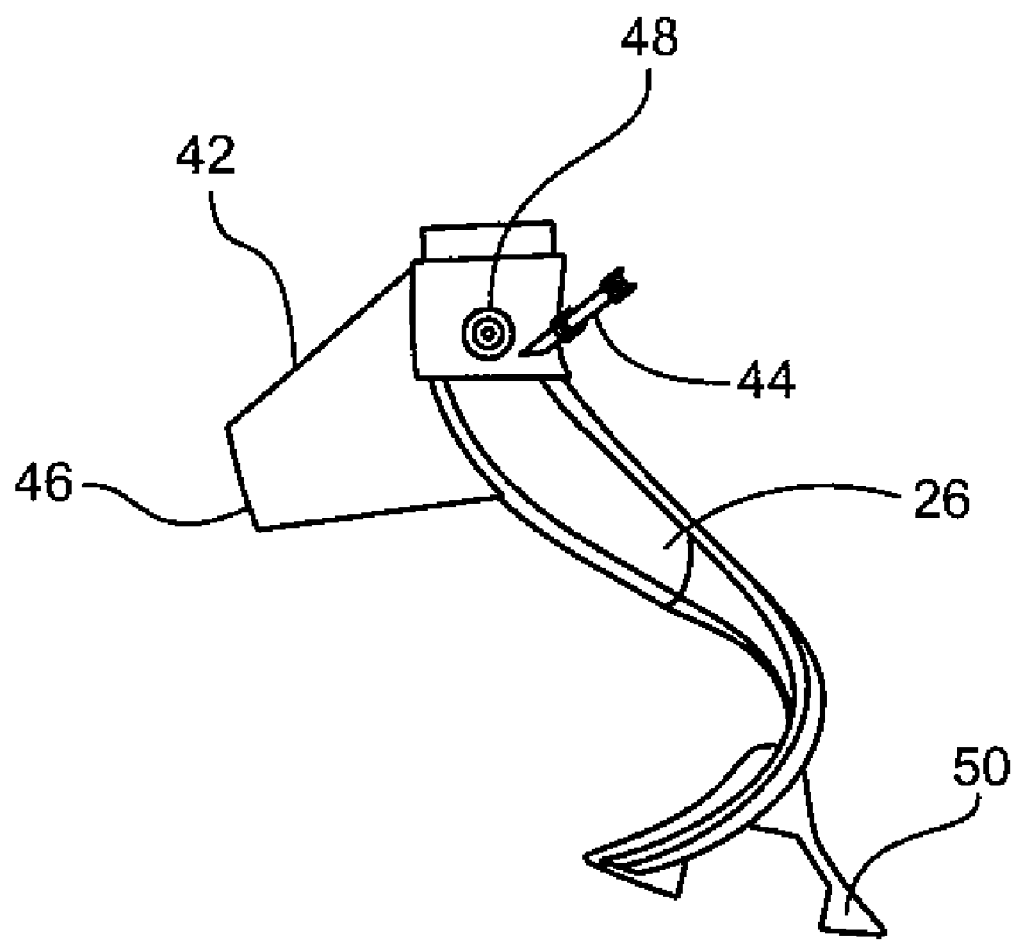
FIG. 6 is a side view of a portion of the ventilation system of FIG. 2 illustrating mounting points.

Referring to FIGS. 3-6, various views of adjacent support ducts 26 with their respective storage bin removed are shown. Adjacent support ducts 26 cooperatively provide the support structure for a stowage bin. The support ducts 26 are interconnected with a bracket 42 that serves to both aid in retaining the stowage bin to the support ducts and provide a decorative faceplate 46 for concealing the underlying ventilation structure. The bracket includes fasteners 44 for securing the system to the interior wall of the aircraft or to the aircraft frame. The fasteners 44 have a length sufficient to extend from their attachment point on the bracket 42 to the wall or frame. In an alternative embodiment, the fasteners 44 may be directly attached to the support ducts 26. Referring specifically to FIG. 6, a common mounting point 48 may be used to secure both the bin and the bracket 42 to the support ducts 26. The system further includes outlet brackets 50 for securing and/or maintaining the support ducts away from or against the interior wall.

The inlet 30 or neck portion 34 is preferably positioned at the interface between adjacent stowage bins, and as stated above, adjacent outlet portions 32 are sized to span the length of the stowage bin to provide support. Referring to FIG. 5, the inlet 30 as shown has its longitudinal axis aligned parallel with the bin interface to maximize the use of available space to increase the stowage bin capacity. In contrast, the conventional assembly in which the ventilation system does not support the bin system positions the inlet at about mid-span along the length of a bin, thus requiring more room immediately behind the bin. The position of the support ducts 26 with respect to the bin interface of the present invention further provides greater support each bin because the bin is cooperatively supported by adjacent ducts positioned at each end of the bin.

Figure 7:
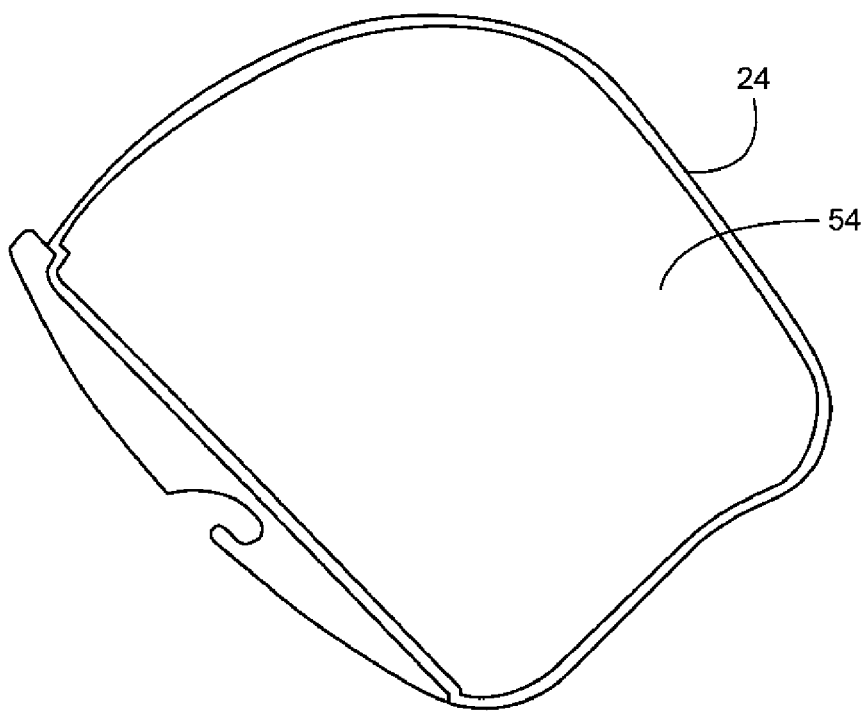
FIG. 7 is a cross-section of a luggage bin adapted for use with the system of FIG. 1.
Figure 8:
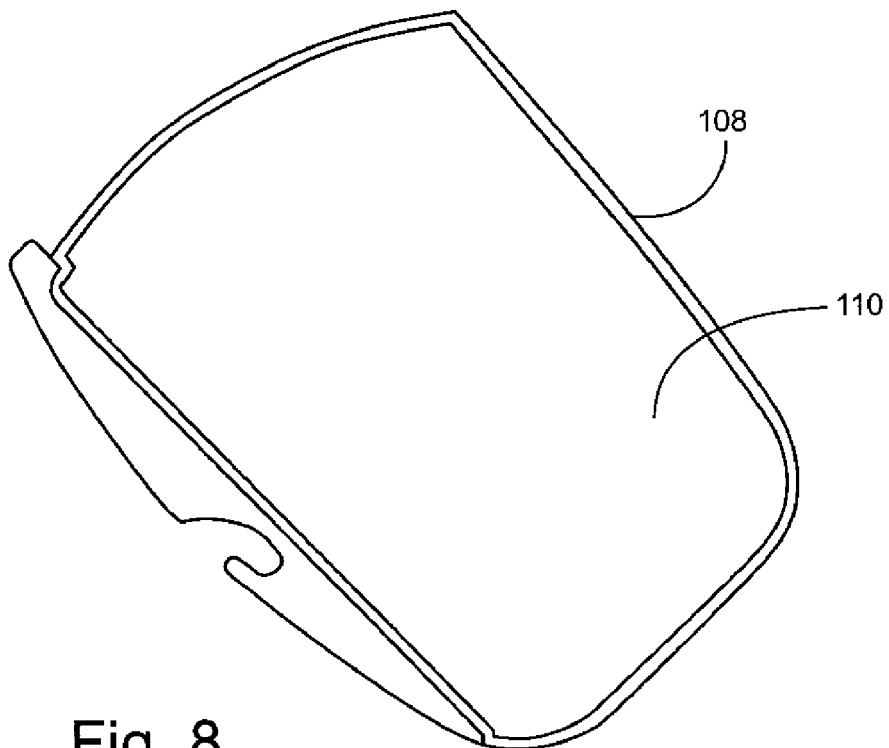
FIG. 8 is a cross-section of a prior art stowage bin.

Referring to FIG. 7, a stowage bin 24 defining an interior volume 54 and adapted for use with the ventilation support system of the present invention is shown. Referring to prior art FIG. 8, a conventional stowage bin 108 defining an interior volume 110 and adapted for use with a conventional system is shown. The stowage bin 24 of the present invention defines a greater interior volume as a result of the ventilation support system of the present invention.

The foregoing is a description of a combination ventilation and stowage bin system given by way of example only. Although the invention has been described with reference to preferred embodiments thereof, other embodiments may perform similar functions and/or achieve similar results. Any and all such equivalent embodiments and examples are within the spirit and scope of the present invention and are intended to be covered by the appended claims.

What is claimed is:

1. A combination ventilation and stowage bin system, comprising:
    at least one support duct defining an inlet for receiving conditioned air from a supply duct and an outlet for directing air into a passenger compartment; and
    a stowage bin for stowing luggage mounted to and supported by the at least one support duct, wherein the stowage bin is supported and retained solely by the at least one support duct such that the stowage bin is free from direct attachment to an interior wall or supporting structure other than the at least one support duct.

2. The combination ventilation and stowage bin system according to claim 1, further comprising a support duct positioned about each end of the stowage bin for cooperatively supporting the stowage bin.

3. The combination ventilation and stowage bin system according to claim 1, wherein the inlet defines a neck portion and the outlet defines a fan-shape for providing a surface for seating and supporting the stowage bin.

4. The combination ventilation and stowage bin system according to claim 1, wherein the outlet is dimensioned larger than the inlet.

5. The combination ventilation and stowage bin system according to claim 1, further comprising a bracket for mounting the stowage bin to the at least one support duct.

6. The combination ventilation and stowage bin system according to claim 1, wherein the at least one support duct defines a curvature for following the contour of the stowage bin.

7. The combination ventilation and stowage bin system according to claim 1, wherein the at least one support duct is mounted to an interior wall or frame.

8. The combination ventilation and stowage bin system according to claim 1, further comprising a plurality of support ducts and stowage bins, wherein the inlet of each of the plurality of support ducts is positioned at the interface of adjacent stowage bins.

9. The combination ventilation and stowage bin system according to claim 1, further comprising a bracket for supporting the outlet against an interior wall of an aircraft cabin.

10. The combination ventilation and stowage bin system according to claim 1, wherein the stowage bin comprises a door.

11. A combination ventilation and stowage bin system, comprising:
    a ventilation supply duct for providing conditioned air;
    a plurality of support ducts branching from the supply duct at predetermined positions, each support duct defining an inlet for receiving the conditioned air from the supply duct and an outlet for directing the conditioned air into a vehicle cabin; and
    a plurality of stowage bins secured to and supported by the plurality of support ducts;
    wherein the stowage bins are supported and retained solely by the plurality of support ducts such that the stowage bins are free from direct attachment to an interior wall or supporting structure other than the plurality of support ducts.

12. The combination ventilation and stowage bin system according to claim 11, wherein the inlet of each of the support ducts is positioned at an interface between adjacent stowage bins.

13. The combination ventilation and stowage bin system according to claim 11, wherein each of the plurality of support ducts defines a curvature for following the contour of the plurality of stowage bins.

14. The combination ventilation and stowage bin system according to claim 11, further comprising a bracket for supporting the outlet against an interior wall of an aircraft cabin.

15. The combination ventilation and stowage bin system according to claim 11, further comprising a bracket for mounting a single stowage bin to adjacent ones of the plurality of support ducts.

16. The combination ventilation and stowage bin system according to claim 11, wherein each of the plurality of support ducts defines a neck portion and a fan-shaped portion defining a curvature for seating the plurality of stowage bins.

17. The combination ventilation and stowage bin system according to claim 11, wherein the outlet is dimensioned larger than the inlet.

18. The combination ventilation and stowage bin system according to claim 11, wherein each of the plurality of stowage bins comprises a door.

* * * * *